(12) United States Patent  (10) Patent No.: US 8,731,794 B2
Kim  (45) Date of Patent: May 20, 2014

(54) CONTROL SYSTEM FOR FOUR-WHEEL DRIVE VEHICLE

(75) Inventor: Gyu Tak Kim, Seoul (KR)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/997,331

(22) PCT Filed: Dec. 13, 2011

(86) PCT No.: PCT/KR2011/009600
§ 371 (c)(1),
(2), (4) Date: Jul. 29, 2013

(87) PCT Pub. No.: WO2012/086958
PCT Pub. Date: Jun. 28, 2012

(65) Prior Publication Data
US 2013/0325276 A1    Dec. 5, 2013

(30) Foreign Application Priority Data

Dec. 22, 2010   (KR) .................. 10-2010-0132708

(51) Int. Cl.
*G06F 7/00*  (2006.01)
(52) U.S. Cl.
USPC .......................................................... 701/69
(58) Field of Classification Search
None
See application file for complete search history.

(56) References Cited

U.S. PATENT DOCUMENTS

| | | | |
|---|---|---|---|
| 5,927,425 A | 7/1999 | Kusano | |
| 5,979,584 A | 11/1999 | Glab et al. | |
| 7,749,132 B2 * | 7/2010 | Motosugi et al. | 477/5 |
| 2003/0071513 A1 * | 4/2003 | Elkow | 301/13.1 |
| 2007/0275823 A1 * | 11/2007 | Motosugi et al. | 477/176 |
| 2008/0065305 A1 | 3/2008 | Hattori et al. | |
| 2011/0298422 A1 * | 12/2011 | Failing | 320/109 |
| 2011/0301795 A1 * | 12/2011 | Failing | 701/22 |
| 2011/0302078 A1 * | 12/2011 | Failing | 705/39 |

FOREIGN PATENT DOCUMENTS

| | | |
|---|---|---|
| EP | 1734238 A1 | 12/2006 |
| KR | 1020060130255 A | 12/2006 |
| KR | 2008021336 A | 3/2008 |

* cited by examiner

*Primary Examiner* — Thomas Tarcza
*Assistant Examiner* — Adam Alharbi
(74) *Attorney, Agent, or Firm* — Laurence A. Greenberg; Werner H. Stemer; Ralph E. Locher

(57) ABSTRACT

In a control system for a four-wheel drive vehicle, when the four-wheel drive vehicle is four-wheel driven full time (that is, at all times), the difference in rotation of each wheel occurring due to the difference in air pressure within each tire, is differentiated from the difference in rotation of each wheel occurring due to cornering or the state of the road surface, and is correspondingly corrected so as to distribute the driving force to the four wheels. Thus, even if the difference in rotation of each wheel occurs due to the air pressure within each tire, the malfunction in which four-wheel driving is controlled based on the erroneous determination that the difference in rotation of each wheel is due to cornering or the state of the road surface can be prevented from occurring.

7 Claims, 3 Drawing Sheets

CONTROL SYSTEM FOR FOUR-WHEEL DRIVE VEHICLE

TECHNICAL FIELD

The present invention relates to a control system for four-wheel drive vehicles, in particular four-wheel drive vehicles that can distribute the driving force to the front wheels and rear wheels based on the actual count of tire rotations and the count of tire rotations provided by the Hall sensor.

BACKGROUND TECHNOLOGY

By the mode in which the driving force generated by the vehicle engine is transferred to the driving wheels, vehicles are classified into two-wheel drive vehicles and four-wheel drive vehicles.

Here, the two-wheel drive vehicles are classified into Front engine Rear drive (FR) mode and Front engine Front drive (FF) mode by the location of the driving wheels, namely the rear wheels or the front wheels that actually drive the vehicle.

The driving force generated by the engine of a four-wheel drive vehicle is transferred to the front wheels and the rear wheels at the same time to drive the whole vehicle and improve the stability when the vehicle runs on a road on a rainy or snowy day or on an icy road, or enhance the vehicle driving performance when the vehicle runs on an off-road surface such as gravel road surface or rugged road surface.

Currently when the four-wheel drive system for the off-road purpose is used to transfer the driving force, since the driving force is directly transferred between the front wheels and the rear wheels and the rotation difference between the wheels cannot be offset when the vehicle turns a corner, the vehicle cannot make a turn as desired by the driver. This phenomenon is called "Tight corner braking".

To solve the aforesaid problem in the full-time four-wheel drive system for the on-road purpose, a multi-disk clutch is set between the front wheels and the rear wheels. If a rotation difference occurs between the wheels when the vehicle makes a turn or the road surface condition changes, the multi-disk clutch is driven to distribute the driving force between the front wheels and the rear wheels and offset the rotation difference between the wheels, thus improving driving safety of the vehicle.

However, the Transfer Case Control Unit (TCCU) responsible for distributing the driving force to the four wheels in the full-time four-wheel drive system cannot distinguish the inter-wheel rotation differences when the vehicle makes a turn or runs on a slippery road surface from the inter-wheel rotation differences caused by the air pressure difference among the tires. When the inter-wheel rotation differences occur due to the air pressure difference among the tires, the TCCU also thinks the rotation differences are arising from making a turn or a road surface condition change, and will then implement the drive control on the four wheels.

Owing to the aforesaid disadvantage, the multi-disk clutch may also operate continuously in a situation where it should not operate, which leads to a failure of the four-wheel drive system.

DETAILS OF THE INVENTION

Technical Topic

The present invention is proposed to solve the aforesaid problem. It is intended to properly distribute the driving force to the front wheels and rear wheels according to the inter-wheel rotation differences caused by the air pressure of each tire and the inter-wheel rotation differences due to turning or a road surface condition change when the four-wheel drive vehicle is under driving control, and provide a control system for a four-wheel drive vehicle to prevent a failure when the four-wheel drive vehicle changes its speed.

Topic Solution

To achieve the aforesaid purpose, the control system for a four-wheel drive vehicle disclosed in the present invention comprises: a speed change part that transfers the driving force from the engine and then outputs a speed change driving force through a specific gear depending on the adjustment status of the electromagnetic valve; a transfer case part that transfers said speed change driving force from said speed change part and then drives either the rear wheel drive shaft of the vehicle or the front wheel drive shaft of the vehicle through the operation of a built-in motor; a tire pressure sensing part that is installed on the tires of said vehicle and used to measure the air pressure of the tires and an electronic control part that calculates the count of rotations of the tire according to the measured tire air pressure value provided by said tire pressure sensing part, compares calculated rotations with the actual rotations to judge whether the corresponding tire has a rotation difference, and, when the wheel has the aforesaid rotation difference arising from the tire air pressure difference, outputs control signals used to operate and control said transfer case to distribute said speed change driving force, so as to offset the rotation difference.

Particularly, said electronic control part comprises: a Tire Pressure Monitor System (TPMS) that receives the measured tire air pressure value from said tire pressure sensing part and a Transfer Case Control Unit (TCCU) that communicates with said TPMS and receives the measured tire air pressure value of each wheel, and, based on this value, judges whether the corresponding tire has said rotation difference due to the tire air pressure difference, and outputs control signals according to the judgment result for the operation and control of said transfer case.

Particularly, said electronic control part is characterized in that, if said rotation difference of the corresponding wheel exceeds the preset threshold, it outputs a control signal to offset the generated rotation difference for the operation and control of said transfer case to distribute said speed change driving force.

Particularly, said electronic control part calculates the dynamic radius of the corresponding wheel according to the measured tire air pressure value provided by said tire pressure sensing part, and then uses the calculated dynamic radius to calculate the count of rotations of the corresponding wheel.

Particularly, said control system for a four-wheel drive vehicle is characterized in that a wheel sensing part is provided at one side of each wheel and used to determine said actual rotation count.

Particularly, said tire pressure sensing part wirelessly transfers the measured tire air pressure value to said electronic control part.

Particularly, said tire pressure sensing part comprises a tire pressure sensor installed at the inner side of said tire and used to measure the air pressure of the corresponding tire, and a wireless communication module that wirelessly transfers said measured air pressure value of tire to said electronic control part.

Benefits of the Invention

Particularly, the present invention, in the process of implementing four-wheel drive control for a four-wheel drive vehicle in the full-time mode (that is, at all times), distinguishes the rotation difference of the wheels due to the air pressure difference of the tires from the rotation difference of each wheel caused by turning or a road surface condition change, and offsets the corresponding rotation difference by distributing the driving force to the four wheels, thereby correcting the aforesaid mistake of treating the rotation difference of each wheel arising from the tire air pressure difference as the rotation difference of each wheel caused by turning or a road surface condition change, thus performing the four-wheel drive control by mistake.

BRIEF DESCRIPTION OF DRAWINGS

For easier understanding of the technical idea in the present invention, the present invention is further detailed in conjunction with the following attached drawings, which illustrate the best embodiment of the present invention. Nevertheless, the present invention is not limited to the embodiments shown in the drawings.

PREFERRED EMBODIMENTS OF THE INVENTION

The preferred embodiments for the control system (100) for four-wheel drive vehicles according to the present invention are detailed below with reference to the attached drawings.

Figure 1:
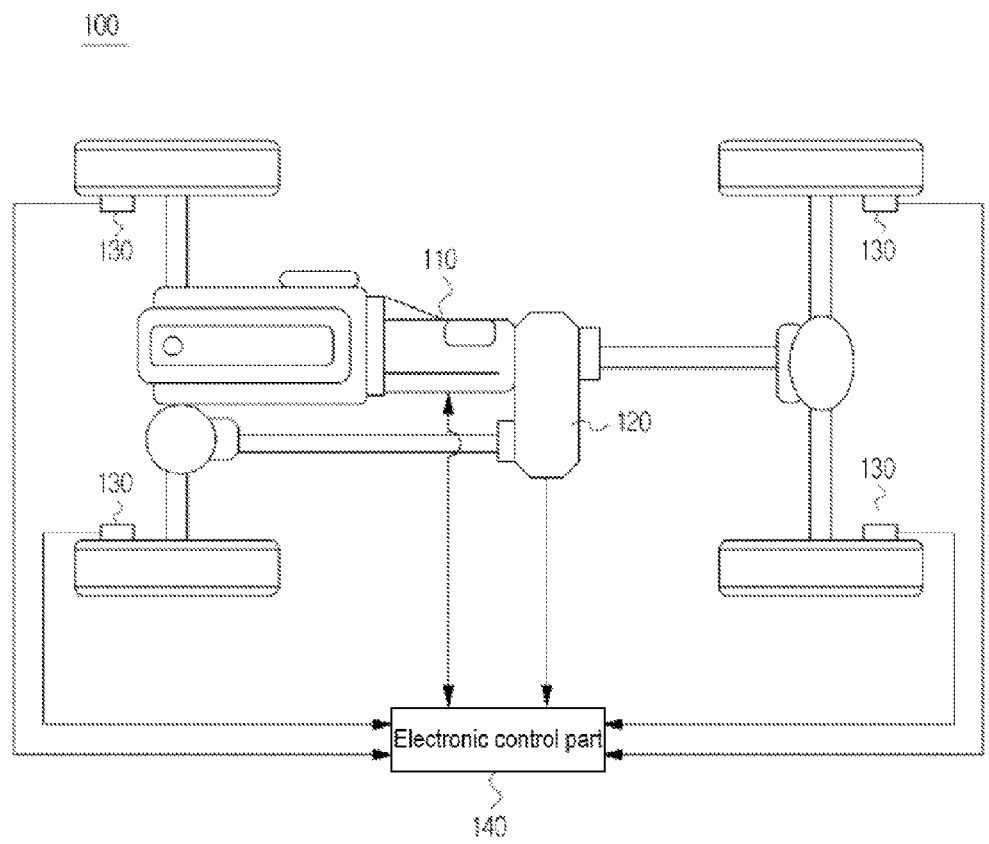
FIG. 1 shows an embodiment of the control system for four-wheel drive vehicles according to the present invention.

FIG. 1 shows an embodiment of the control system (100) for four-wheel drive vehicles. As shown in FIG. 1, when the control system (100) for four-wheel drive vehicles implements the four-wheel drive control on a four-wheel drive vehicle in the full-time mode (that is, at all times) it accurately judges the rotation difference of each wheel caused by the air pressure difference of each tire, and distributes the driving force among the four wheels through its structure to offset the rotation difference among the wheels.

In other words, in the original module for four-wheel drive control according to the rotation difference of each wheel arising from turning or road surface condition change that is provided in the control system (100) for four-wheel drive vehicles, a four-wheel drive control module for offsetting the rotation difference of each wheel caused by the air pressure difference of each tire is added to cope with more driving conditions.

Now, to perform the four-wheel drive control and offset the rotation difference of each wheel due to the tire air pressure difference, the control system (100) for four-wheel drive vehicles comprises: a speed change part (110) that transfers the driving force from the engine after the engine is started, and changes the speed and outputs the engine driving force through a specific gear depending on the adjustment status of an electromagnetic valve; a transfer case part (120) that transfers the speed change driving force from the speed change part (110) and then drives either the rear wheel drive shaft of the vehicle or the front wheel drive shaft of the vehicle through operation of a built-in motor; a tire pressure sensing part (130) that is installed on each tire of the vehicle and used to measure the air pressure of each tire; and an electronic control part (140) that calculates the rotations of the corresponding wheel according to the measured tire air pressure value provided by the tire pressure sensing part (130), compares the calculated rotations with the actual rotations to judge whether the corresponding wheel has a rotation difference, and, when the wheel has a rotation difference arising from the tire air pressure difference, outputs a control signal for the operation and control of the transfer case to distribute the speed change driving force sent from the speed change part (110), with a view to offsetting the rotation difference.

The electronic control part (140) comprises: a Tire Pressure Monitor System (TPMS) that receives the measured air pressure value of tire from the tire pressure sensing part (130) and monitors the value and a Transfer Case Control Unit (TCCU) that implements CAN communication with the TPMS and receives the measured tire air pressure value for each wheel, and, based on this value, judges whether the corresponding wheel has a rotation difference due to the tire air pressure difference, and outputs a control signal for the operation and control of the transfer case according to the judgment result (the corresponding wheel has a rotation difference due to the tire air pressure difference) so as to offset the rotation difference.

When the TCCU performs CAN communication with the TPMS, receives the measured tire air pressure value for each wheel, and, based on this value, judges whether the corresponding wheel has a rotation difference due to the air tire pressure difference, preferably it only judges the situations in which the rotation difference of the corresponding wheel exceeds the preset threshold, and executes accordingly.

If the TCCU judges that the rotation difference of the corresponding wheel caused by the tire air pressure difference does not exceed the preset threshold, it will not operate or control the transfer case to offset the rotation difference.

The TCCU judges whether the corresponding wheel has a rotation difference due to the tire air pressure difference through the following steps: the TCCU receives the measured tire air pressure value for each wheel from the TPMS, uses this value as a basic parameter to calculate the dynamic radius of the corresponding tire, and then calculates the rotations of the corresponding wheel according to the obtained dynamic radius of the corresponding wheel (that is, it calculates the rotations that are proportional to the dynamic radius of wheel according to the reference speed; this kind of module can be used to calculate the rotations that are proportional to the dynamic radius of the corresponding wheel).

With regard to the tire air pressure, the control system (100) for four-wheel drive vehicles first calculates the rotations of the corresponding wheel, compares it with the actual rotations of the corresponding wheel, and then obtains the rotation difference based on the comparison result. Therefore, the wheel sensing part should be preferably provided at one side of each wheel so that the actual rotations of the corresponding wheel can be confirmed.

Figure 2:
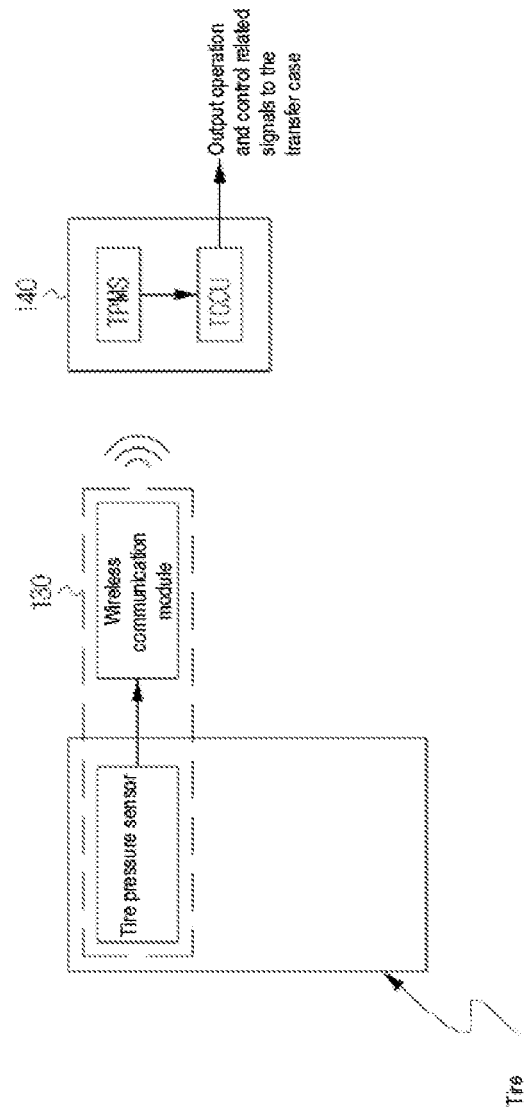
FIG. 2 shows an embodiment of the signal transfer process between the tire pressure sensing part and the electronic control part shown in FIG. 1.

FIG. 2 shows an embodiment of the signal transfer process between the tire pressure sensing part (130) and the electronic control part (140) shown in FIG. 1. As shown in FIG. 2, the tire pressure sensing part (130) can wirelessly transfer the measured tire air pressure values to the electronic control part (140).

To realize the aforesaid process, the tire pressure sensing part (130) comprises: a tire pressure sensor that is set inside the tire to measure the air pressure of the tire, and a wireless communication module that receives the measured air pressure value of the corresponding tire from the tire pressure sensor and then wirelessly transfers the measured value to the electronic control part (140), or TPMS.

Figure 3:
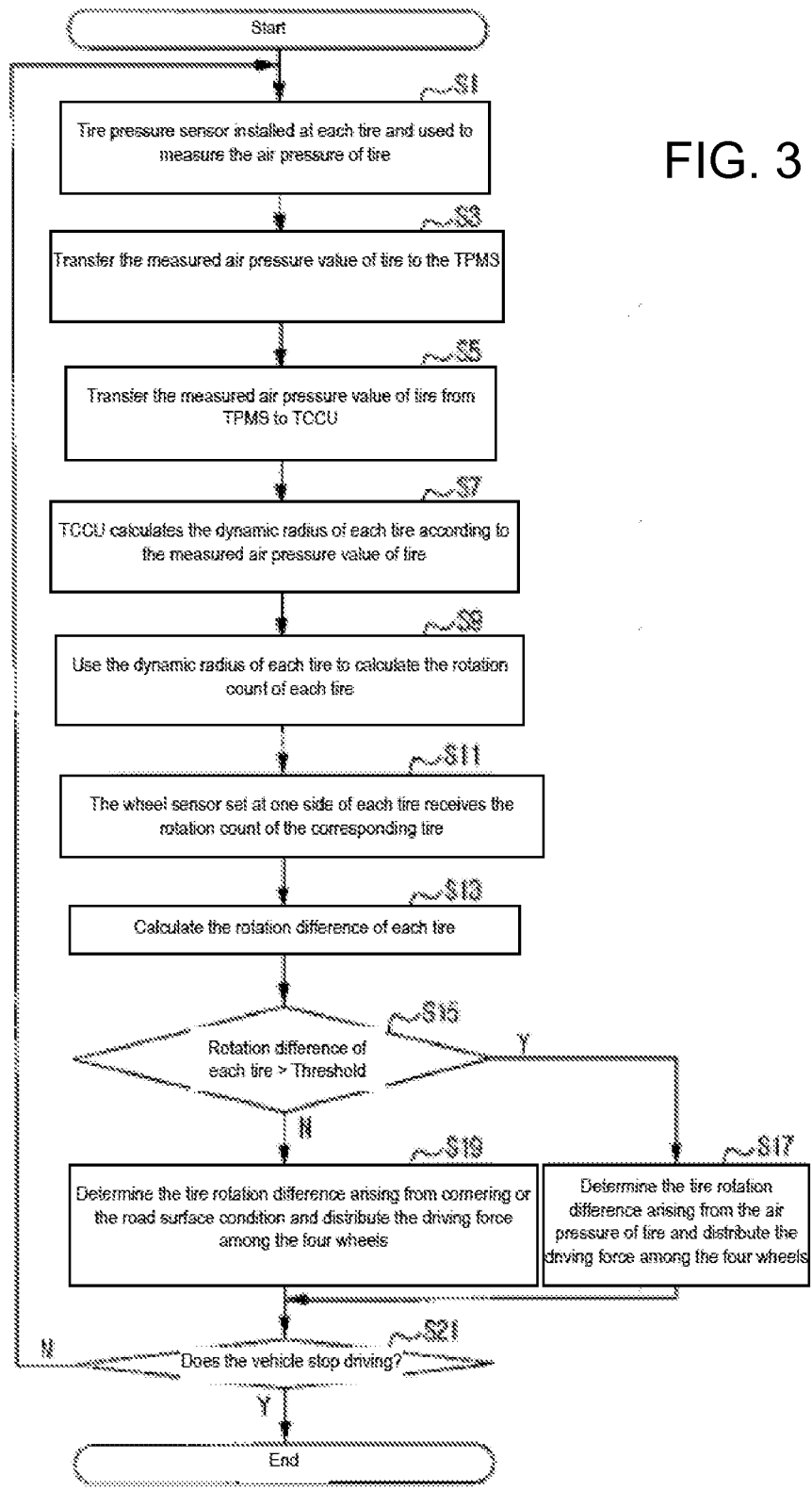
FIG. 3 shows an embodiment of the operating process of the control system for four-wheel drive vehicles shown in FIG. 1.

FIG. 3 shows an embodiment of the operating process of the control system (100) for four-wheel drive vehicles in FIG. 1. As shown in FIG. 3, the four-wheel drive vehicle is controlled through the tire pressure sensing part (130) that is set at each tire and monitors the air pressure of the corresponding tire in real time (S1).

The tire pressure sensing part (130) transfers the measured air pressure value of the corresponding tire to the TPMS (S3).

The TPMS transfers the measured air pressure value of each tire being monitored to the TCCU in the CAN communication mode (S5).

The TCCU uses the received air pressure value measured for each tire to calculate the dynamic radius of the corresponding tire (S7).

The dynamic radius of each tire calculated in S7 is applied to the preset module and used to calculate the count of tire rotations corresponding to each dynamic radius (S9).

The TCCU receives the actual rotations of each tire from the wheel sensor set at one side of the corresponding tire (S11), compares it with the counted rotations of each tire corresponding to the dynamic radius of each tire, and obtains the difference of the two, which is the rotation difference (S13).

If the rotation difference of each tire calculated in S13 exceeds the preset threshold, the TCCU judges that the rotation difference is caused by the air pressure of tire, and performs the related operation to offset the rotation difference, namely, it distributes the driving force among the four wheels to offset the rotation difference arising from the air pressure of tire (S17).

If the rotation difference of each tire calculated in S13 does not exceed the preset threshold, the TCCU judges that the rotation difference is caused by turning or road surface condition change, and distributes the driving force among the four wheels (S19).

When the vehicle stops running, the aforesaid process is also terminated (S21).

The above only describes the preferred embodiments of the present invention, and those ordinarily skilled in the field can make various modifications or alterations without departing from the purpose and field of the invention as described in the following claims.

INDUSTRIAL APPLICABILITY

In addition, in the process of implementing four-wheel drive control on a four-wheel drive vehicle in the full-time mode (that is, at all times), if each wheel has a rotation difference due to the difference in the air pressure of each tire, the present invention distinguishes such difference from the rotation difference of each tire arising from turning or road surface condition change, and distributes the driving force among the four wheels to offset the corresponding rotation difference. Therefore, the present invention can be marketed or sold, and can be definitely implemented in practice, so it is an invention of industrial applicability.

The invention claimed is:

1. A control system for a four-wheel drive vehicle, the control system comprising:
   a speed change part configured to transfer a driving force from an engine of the vehicle, and to output a speed change driving force through a specific gear depending on an adjustment status of an electromagnetic valve;
   a transfer case part configured to transfer the speed change driving force from said speed change part and to drive either a rear wheel drive shaft of the vehicle or a front wheel drive shaft of the vehicle through an operation of a built-in motor;
   a tire pressure sensing part installed to measure an air pressure in each tire of the vehicle; and
   an electronic control part configured to calculate the rotations of the corresponding tire according to the measured tire air pressure value provided by said tire pressure sensing part, to compare counted rotations with actual rotations of the corresponding tire to judge whether the corresponding tire exhibits a rotation difference, and, when the respective wheel exhibits a rotation difference arising from a tire air pressure difference, to output control signals for the operation and control of said transfer case to distribute said speed change driving force, so as to offset the rotation difference.

2. The control system according to claim 1, wherein said electronic control part comprises:
   a Tire Pressure Monitor System connected to receive the measured tire air pressure value from said tire pressure sensing part and a Transfer Case Control Unit configured to communicate with said TPMS and to receive the measured tire air pressure value for each wheel, and, based on the value, to judge whether the corresponding wheel has the rotation difference due to the tire air pressure difference, and to output a control signal according to the judgment result for the operation and control of said transfer case.

3. The control system according to claim 1, wherein, if the rotation difference of the corresponding wheel exceeds a preset threshold, said electronic control part outputs a control signal for operating and controlling said transfer case to distribute the speed change driving force, so as to offset the generated rotation difference.

4. The control system according to claim 1, wherein said electronic control part is configured to calculate a dynamic radius of the corresponding wheel according to the measured tire air pressure value provided by said tire pressure sensing part, and then to utilize the calculated dynamic radius to calculate the rotations of the corresponding wheel.

5. The control system according to claim 1, which further comprises a wheel sensing part disposed at one side of each wheel and used to determine the actual rotations.

6. The control system according to claim 1, wherein said electronic control part is configured to receive a measured air pressure value of each tire through a wireless link.

7. The control system according to claim 6, wherein said tire pressure sensing part comprises:
   a tire pressure sensor installed at an inner side of said tire and used to measure the air pressure of the corresponding tire; and
   a wireless communication module for wirelessly transferring the measured air pressure value of tire to said electronic control part.

* * * * *